(12) United States Patent
Oda

(10) Patent No.: US 6,765,210 B2
(45) Date of Patent: Jul. 20, 2004

(54) INFRARED SENSOR WITH HYSTERESIS AND DRIVING METHOD THEREOF

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 167 days.

(21) Appl. No.: 10/208,759

(22) Filed: Aug. 1, 2002

(65) Prior Publication Data
US 2003/0042421 A1 Mar. 6, 2003

(30) Foreign Application Priority Data
Aug. 1, 2001 (JP) ........................................ 2001-233257

(51) Int. Cl.[7] .............................................. H01L 31/08
(52) U.S. Cl. ............................... 250/338.3; 250/338.1; 250/338.4; 250/332; 250/352
(58) Field of Search ............................. 250/332, 338.1, 250/338.3, 338.4, 339.03, 352

(56) References Cited

U.S. PATENT DOCUMENTS 6,121,618 A * 9/2000 Morris ........................ 250/352
6,437,331 B1 * 8/2002 Kawano ................... 250/338.3

FOREIGN PATENT DOCUMENTS

| JP | 10-3118842 | * | 4/1998 | ............ G01J/5/02 |
| JP | A 2000-55737 | | 2/2000 | |

* cited by examiner

Primary Examiner—Nikita Wells
Assistant Examiner—Christopher M. Kalivoda
(74) Attorney, Agent, or Firm—Young & Thompson

(57) ABSTRACT

A bolometer-type infrared sensor using a resistor with a hysteresis in its thermal characteristic of resistance increases the sensitivity. A first temperature controller raises or drops the temperature of the diaphragm from its outside. A second temperature controller raises the temperature of the diaphragm from its inside by supplying electricity to the bolometer film. The first temperature controller defines a lower-side temperature of a temperature cycle while the first and second temperature controllers define an upper-side temperature thereof. The temperature of the diaphragm is controlled according to the temperature cycle. A signal on the diaphragm is read out at the upper-side temperature.

9 Claims, 7 Drawing Sheets

INFRARED SENSOR WITH HYSTERESIS AND DRIVING METHOD THEREOF

BACKGROUND OF THE INVENTION

1. Field of the Invention

The present invention relates generally to a bolometer-type infrared sensor having a thermal isolation structure. More particularly, the invention relates to a bolometer-type infrared sensor using a resistor with a hysteresis in its thermal characteristic of resistance, and a driving method of the sensor.

2. Description of the Related Art

Conventionally, bolometer-type infrared sensors have typically used bolometer materials without hysteresis in its thermal characteristic of resistance. In recent years, Kawano created an improved bolometer-type infrared sensor having a large temperature coefficient of resistance and a hysteresis in its thermal characteristic of resistance, which is disclosed by the Japanese Non-Examined Patent Publication No. 2000-55737 published in February 2000. This sensor is explained below with reference to FIGS. 1A and 1B, and FIGS. 2 to 4.

FIGS. 1A and 1B show the structure of one pixel of the prior-art infrared sensor array, which is termed an infrared sensor below.

As shown in FIG. 1B, the sensor has a diaphragm 110 for sensing infrared rays. The diaphragm 110 comprises a thin bolometer film 105, a dielectric supporting film 103, a dielectric protecting film 106, and an infrared absorbing film 107. The supporting film 103, which is located on the inner side of the bolometer film 105, supports the film 105. The film 106, which is located to cover the bolometer film 105 on the outer side thereof, is used to protect the film 105. The infrared absorbing film 107 is used to absorb infrared rays irradiated to the diaphragm 110.

The diaphragm 110 further comprises electrodes 104 and 104' at each end (the lower and upper ends in FIGS. 1A and 1B) of the bolometer film 105. The electrode 104 is connected to a wiring line 114. The electrode 104' is connected to a wiring line 114'. on operation, a pulsed bias voltage is applied across the electrodes 104 and 104' by way of the wiring lines 114 and 114'. Due to infrared rays 111 applied, the temperature of the bolometer film 105 changes and thus, the bolometer film 105 generates electrical resistance change. As a result, by reading out the electrical resistance change of the film 105, irradiation of the infrared rays 111 is detected through the change of voltage or current caused by the pulsed bias voltage.

The diaphragm 110 in held on two banks 116 and 116' of a substrate 102 by way of two beams 112 and 112', thereby forming a suspended structure. This suspended structure is to constitute a thermal isolation structure of the diaphragm 110 (i.e., the bolometer film 105) from the substrate 102.

A reflector film 101 is formed on the surface of the substrate 102 sandwiched by the banks 116 and 116'. A cavity or space 109 is formed between the diaphragm 110 and the reflector film 101. The distance between the film 101 and the diaphragm 110 is well adjusted in such a way that almost all the infrared rays 111 are absorbed by the infrared absorbing film 107. Due to absorption of the rays 111, the temperature of the diaphragm 110 rises and thus, the electrical resistance of the bolometer film 105 changes.

The banks 116 and 116' constitute the sidewalls of the cavity 109. The diaphragm 110 is thermally isolated from the banks 116 and 116' by a slit 108.

The reference numerals 113 and 113' denote the roots of the beams 112 and 112', respectively. The reference numerals 115 and 115' denote the contacts with the wiring lines 114 and 114', respectively.

FIG. 2 shows the relationship between the specific resistance σ and the temperature T of the bolometer film 105 used in the prior-art infrared array sensor of FIGS. 1A and 1B. A pulsed bias voltage or current is periodically applied to the bolometer film 105, thereby repeating the temperature cycle shown in FIG. 3. In FIG. 3, $t_f$ is the frame time and $t_{ro}$ is the read-out time. The pulsed bias voltage or current is applied during the read-out time $t_{ro}$. The application timing of the pulsed bias voltage or current is not shown in FIG. 3. The temperature of the bolometer film 105 is gradually risen or dropped to draw the temperature cycle of FIG. 2. In this temperature cycle, the maximum variation range of temperature is ΔTc, which is greater than the hysteresis range ΔTt of temperature (i.e., ΔTc >ΔTt) The maximum variation range ΔTc is set by adjusting the value of the pulse width $t_{ro}$ or voltage in such a way as to be greater than (ΔTt+ΔTmax), where ΔTmax is the maximum temperature change of the temperature sensing section of the bolometer film 105 caused by the possible change of the infrared rays 111.

Here, when the quantity of the irradiated infrared rays 111 is equal to the reference value, the state of the bolometer film 105 is situated at the point A (temperature: $T_{obj}$) on the temperature falling curve 150 in FIG. 2. Then, the state of the bolometer film 105 is gradually changed to go along the given temperature cycle. First, the pulsed bias voltage is applied to the film 105 to start raising its temperature. Then, the temperature of the film 105 rises without changing its physicochemical structure and as a result, the specific resistance curve (A→B) intersects with the temperature rising curve 151 at the point B (temperature: $T_B$). Since ΔT is greater than ΔTt, the temperature of the film 105 rises furthermore. When the temperature of the film 105 becomes higher than the temperature. $T_B$, the temperature of the film 105 rises with changing its physicochemical structure and as a result, the state of the film 105 reaches the point C (temperature: $T_c = T_{obj} + ΔTc$).

Subsequently, when the application of the pulsed bias voltage is stopped and the temperature of the film 105 begins to drop, the temperature of the film 105 drops without changing its physicochemical structure and as a result, the specific resistance curve (C→D) intersects with the temperature falling curve 150 at the point D (temperature: $T_D$) Thereafter, the temperature of the film 105 drops with changing its physicochemical structure from the temperature $T_D$ to the starting temperature $T_{obj}$.

If the quantity of the infrared rays 111 from the object is decreased, the temperature of the bolometer film 105 drops by $ΔT_{obj}$ with the temperature cycle in question. Therefore, the temperature cycle curves 150 and 151 are laterally shifted to the lower side (to the left side in FIG. 2) by $ΔT_{obj}$ and as a result, the point A is shifted to the point A'. The point A' in FIG. 2 denotes the starting point of the next temperature cycle.

In this way, by detecting the temperature shift $ΔT_{obj}$, the quantity change of the infrared rays 111 can be known while keeping the temperature coefficient of resistance (TCR) high.

In FIG. 2, the starting point of the temperature cycle is placed on the point A, which is located on the temperature falling curve 150. However, the same result as described above is obtainable if the starting point is placed on a point that is not located on the hysteresis curve 150 and 151.

FIG. 4 shows the relationship between the specific resistance 6 and the temperature T of the bolometer film 105, where the starting point is placed on the point C that is shifted to the higher temperature side from the temperature rising curve 151. The temperature of the bolometer film 105 is dropped and risen to draw the temperature cycle of FIG. 4 In this temperature cycle, the maximum variation range of temperature is $T_1$ to $T_2$, which is located within the hysteresis range of $T_D$ to $T_u$. The pulsed bias condition (i.e., the voltage value and the pulse width) is set in such a way that ΔTc is greater than ΔTt (i.e., ΔTc >ΔTt).

As shown in FIG. 4, at first, the state of the bolometer film 105 is situated at the point C (temperature: $T_2$). Then, the state of the film 105 is gradually lowered to go along the given temperature cycle. The temperature of the film 105 drops without changing its physicochemical structure to reach the point D (temperature: $T_D$) on the temperature falling curve 150 after crossing the temperature rising curve 151. When the temperature of the film 105 further drops, the state of the film 105 reaches the point A (temperature: $T_A$) along the temperature falling curve 150 while changing its physicochemical structure.

In the next rising step, the state of the bolometer film 105 is gradually raised without changing its physicochemical structure to go along the given temperature cycle, thereby reaching the point B (temperature: $T_B$) on the temperature rising curve 151. If the temperature of the bolometer material is further raised, the state of the film 105 reaches the point E (temperature: $T_2$) on the temperature rising curve 151. Thus, the first one temperature cycle is completed. Since the second temperature cycle is started from the point E, the situation change of the film 105 is the same as described here. Accordingly, the same temperature cycle as shown in FIG. 2 is carried out in and after the second temperature cycle. This means that the irradiated infrared rays 111 can be detected in the same manner as explained above with reference to FIG. 2 if the detection operation is carried out in the second or subsequent temperature cycle.

The prior-art infrared sensor of FIGS. 1A and 1B is operable stably under the condition that the temperature change $\Delta T_c$ is set to satisfy the relationship of $\Delta T_c > \Delta T_t + |\Delta T_{obj}|$ and that the range of the temperature cycle is set to be within the hysteresis temperature range from $T_D$ to $T_u$.

With the prior-art infrared sensor of FIGS. 1A and 1B, to realize the desired temperature cycle, an electrical current is intermittently supplied to the bolometer film 105 to thereby generate Joule heat. Thus, a compact infrared sensor is realized without any particular temperature rising/falling device or apparatus. The electrical resistance is measured simultaneously with the supply of the current. These current control and resistance reading operations are performed with a specific integrated circuit device.

FIG. 3 shows an example of the temperature cycle per each frame in the prior-art infrared sensor of FIGS. 1A and 1B. The resistance is measured by detecting the applied voltage and the current flown by the same. In this case, the temperature difference $\Delta T_c$ is expressed by the following equation (1).

$$\Delta T_C = \frac{V_B^2}{R_B} \frac{1}{G_{th}} \left[ 1 - \exp\left(-\frac{\tau_{ro}}{\tau_{th}}\right) \right] \quad (1)$$

In the equation (1), $V_B$ is the bias voltage applied to the bolometer film 105, $R_B$ is the electrical resistance of the film 105, $G_{th}$ is the thermal conductance, $\tau_{th}$ is the thermal time constant, and $\tau_{ro}$ is the pulse width of the pulsed bias voltage (i.e., the read-out time).

To confirm the advantage of the prior-art infrared sensors of FIGS. 1A and 1B, a plurality of the prior-art infrared sensors were arranged in a matrix array at the intervals of 50 μm to thereby constitute an infrared array sensor. The temperature difference $\Delta T_c$ was designed to be 12.9° C. As the bolometer film 105, a vanadium oxide ($VO_2$) film having the temperature coefficient of temperature was 10%/K was used. This $VO_2$ film contained many oxide defects that were generated intentionally. A typical $VO_2$ film containing no phase transition has a temperature coefficient of temperature of approximately 2%/K. The film 105 thus formed had a hysteresis range $\Delta T_t$ of 5° C. The temperature resolution of the sensor array thus formed was measured and as a result, the temperature resolution was 20 mK with respect to the optical system of F/1.

The prior-art infrared sensor of FIGS. 1A and 1B has the following problem.

Before explaining the problem of the prior-art sensor, the responsivity $R_v$ (V/W) of a bolometer-type infrared sensor will be explained below. The responsivity $R_v$ is given by the following equation (2) in the low-frequency range where the thermal time constant does not cause any problem.

$$R_V = \frac{\alpha \eta V_B}{G_{th}} \quad (2)$$

In the equation (2), α is the temperature coefficient of resistance of the bolometer material, η is the infrared absorption rate, $V_B$ is the bias voltage applied to the bolometer film 105, and $G_{th}$ is the thermal conductance. As seen from the equation (2), the responsivity $R_v$ increases as the bias voltage $V_B$ is increased.

With the prior-art infrared sensor of FIGS. 1A and 1B, the sensor has a high sensitivity under the condition that (1) the temperature of the diaphragm 110 is within the temperature range from $T_D$ to $T_u$ where hysteresis occurs, and that (2) the temperature rise $\Delta T_c$ of the diaphragm 110 due to Joule heat is greater than the sum $(\Delta T_t + |\Delta T_{obj}|)$ of the hysteresis range $\Delta T_t$ and the temperature rise $|\Delta T_{obj}|$ due to the irradiation of infrared rays.

However, it is extremely difficult or almost impossible to control the temperatures $T_D$ and $T_u$ and the hysteresis range $\Delta T_t$ in development of bolometer materials with hysteresis- Moreover, to place the operating point in the temperature range from $T_D$ to $T_u$, if the read-out time $t_{ro}$ is fixed, the bias voltage $V_B$ has its upper and lower limits, as seen from the equation (1). If the bias voltage $V_B$ has its upper limit, the responsivity $R_v$ is unable to be equal to or greater than a specific value, as seen from the equation (2). Thus, with prior-art infrared sensor of FIGS. 1A and 1B, the sensitivity is unable to be as high as desired.

SUMMARY OF THE INVENTION

Accordingly, an object of the present invention is to provide a bolometer-type infrared sensor using a resistor with a hysteresis in its thermal characteristic of resistance that increases the sensitivity, and a driving method thereof.

Another object of the present invention is to provide a bolometer-type infrared sensor using a resistor with a hysteresis in its thermal characteristic of resistance that raises the upper limit of the bias voltage, and a driving method thereof.

Still another object of the present invention is to provide a bolometer-type infrared sensor using a resistor with a hysteresis in its thermal characteristic of resistance that expands the freedom of driving, and a driving method thereof.

The above objects together with others not specifically mentioned will become clear to those skilled in the art from the following description.

According to a first aspect of the invention, a bolometer-type infrared sensor is provided, which comprises:

(a) a substrate;

(b) a diaphragm supported by the substrate with a beam in a suspended manner;

the diaphragm having a bolometer film with a hysteresis in its thermal characteristic of resistance;

(c) a first temperature controller for raising or dropping temperature of the diaphragm from its outside; and (d) a second temperature controller for raising temperature of the diaphragm from its inside by supplying electricity to the bolometer film;

wherein the first temperature controller defines a lower-side temperature of a temperature cycle while the first and second temperature controllers define an upper-side temperature thereof;

and wherein the temperature of the diaphragm is controlled according to the temperature cycle;

and wherein a signal on the diaphragm is read out at the upper-side temperature.

With the bolometer-type infrared sensor according to the first aspect of the invention, the first temperature controller raises or drops the temperature of the diaphragm from its outside. The second temperature controller raises the temperature of the diaphragm from its inside by supplying electricity to the bolometer film. The first temperature controller defines the lower-side temperature of a temperature cycle while the first and second temperature controllers define the upper-side temperature thereof. The temperature of the diaphragm is controlled according to the temperature cycle. A signal on the diaphragm is read out at the upper-side temperature.

Accordingly, the upper limit or the bias voltage is raised and the freedom of the driving method is expanded. Thus, the sensitivity is increased.

In a preferred embodiment of the sensor according to the first aspect of the invention, the thermal characteristic of resistance of the bolometer film is divided into a low-temperature region where no hysteresis is seen, a hysteresis region where hysteresis is seen, and a high-temperature region where no hysteresis is seen. The first and second temperature controllers are operated in such a way that the lower-side temperature is placed in the low-temperature region and the upper-side temperature is placed in the hysteresis region.

In another preferred embodiment of the sensor according to the first aspect of the invention, the temperature of the diaphragm is controlled according to the temperature cycle while taking a temperature rise due to irradiated infrared rays into consideration.

In still another preferred embodiment of the sensor according to the first aspect of the invention, a Peltier element and a bias controller are additionally provided. The Peltier element is controlled by the first temperature controller and the bias controller is controlled by the second temperature controller.

According to a second aspect of the invention, a method of driving a bolometer-type infrared sensor is provided. This sensor comprising:

(a) a substrate; and (b) a diaphragm supported by the substrate with a beam in a suspended manner;

the diaphragm having a bolometer film with a hysteresis in its thermal characteristic of resistance.

The method comprises:

(i) raising or dropping temperature of the diaphragm from its outside by a first temperature controller; and (ii) raising temperature of the diaphragm from its inside by supplying electricity to the bolometer film by a second temperature controller;

wherein the first temperature controller defines a lower-side temperature of a temperature cycle while the first and second temperature controllers define an upper-side temperature thereof;

and wherein the temperature of the diaphragm is controlled according to the temperature cycle;

and wherein a signal of the diaphragm is read out at the upper-side temperature.

With the method of driving a bolometer-type infrared sensor according to the second aspect of the invention, because of the same reason as shown in the sensor according to the first aspect, the same advantages as those in the sensor are obtainable.

In a preferred embodiment of the method according to the second aspect of the invention, the thermal characteristic of resistance of the bolometer film is divided into a low-temperature region where no hysteresis is seen, a hysteresis region where hysteresis is seen, and a high-temperature region where no hysteresis is seen. The first and second temperature controllers are operated in such a way that the lower-side temperature is placed in the low-temperature region and the upper-side temperature is placed in the hysteresis region.

In another preferred embodiment of the method according to the second aspect of the invention, the temperature of the diaphragm is controlled according to the temperature cycle while taking a temperature rise due to irradiated infrared rays into consideration.

In still another preferred embodiment of the method according to the second aspect of the invention, a Peltier element and a bias controller are additionally provided. The Peltier element is controlled by the first temperature controller and the bias controller is controlled by the second temperature controller.

In a further preferred embodiment of the method according to the second aspect of the invention, the second temperature controller is operated by changing at least one of a pulsed bias voltage, a pulsed bias current, and a pulse width of the pulsed bias voltage or the pulsed bias current.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMETNS

Figure 1A:
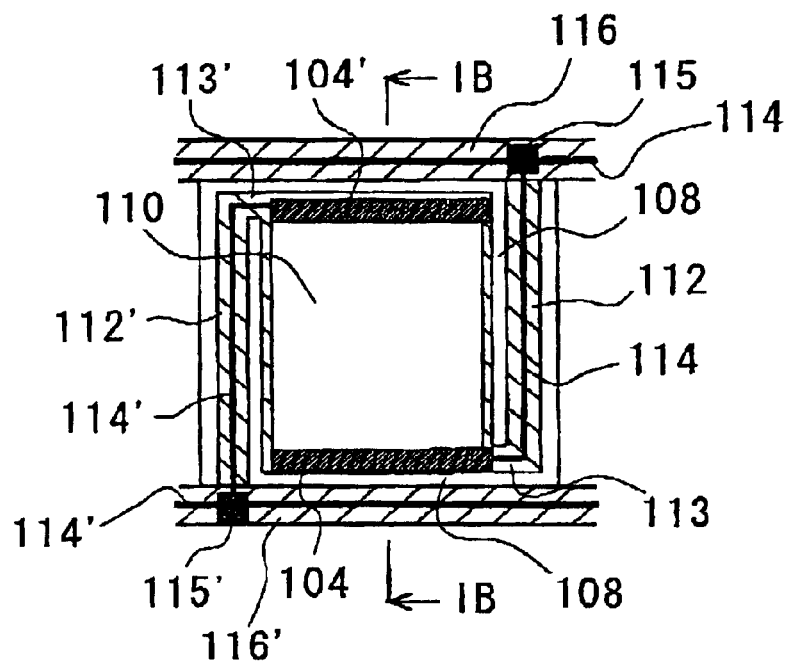
FIG. 1A is a partial plan view showing the structure of a prior-art bolometer-type infrared sensor.
Figure 1B:
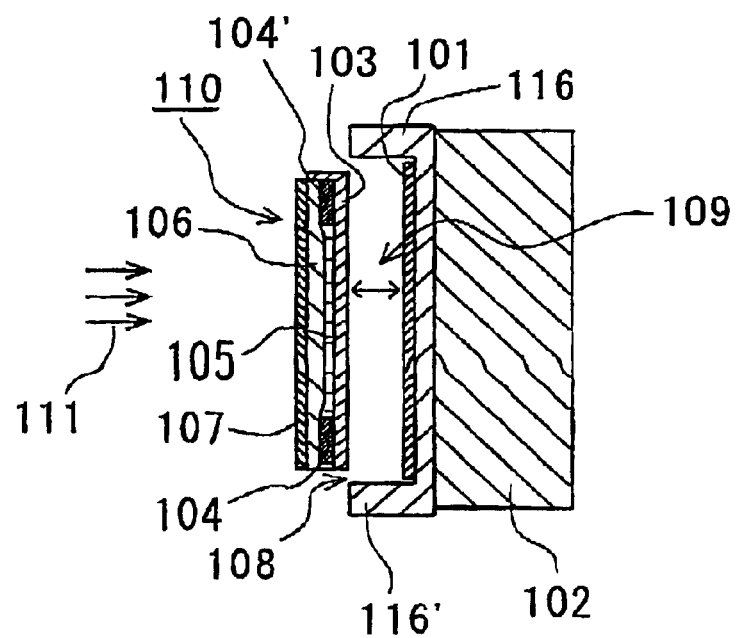
FIG. 1B is a partial, cross-sectional view along the line IB—IB in FIG. 1A.
Figure 2:
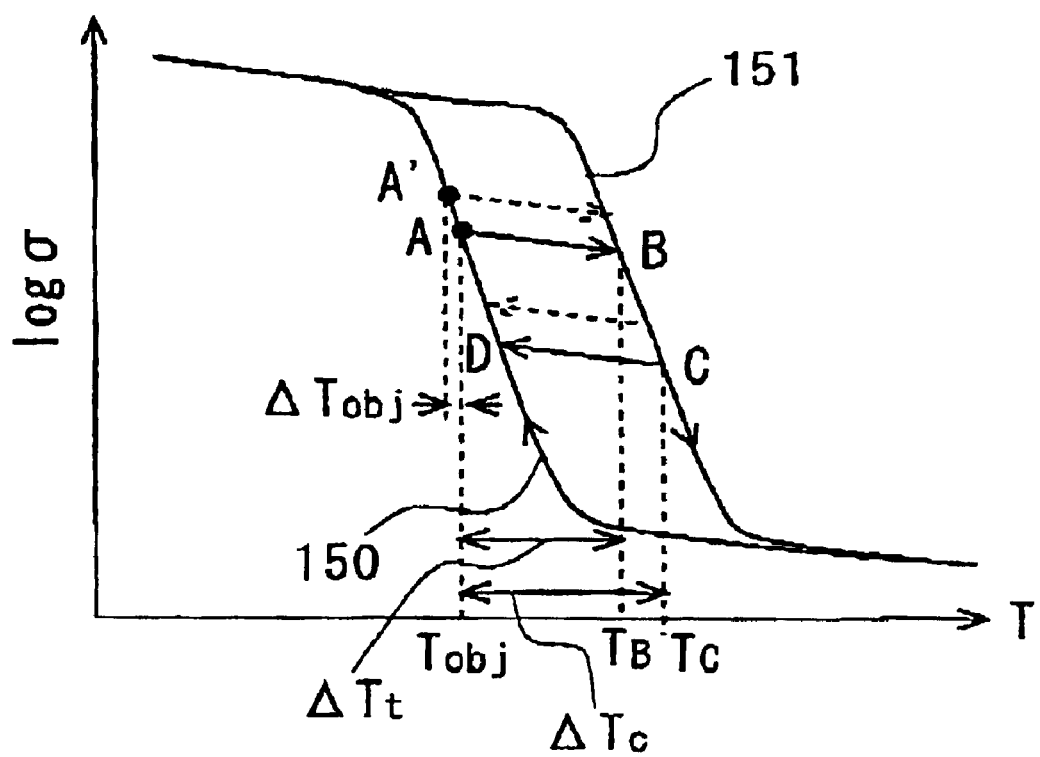
FIG. 2 is a graph showing the relationship between the specific resistance $\sigma$ and the temperature T of the bolometer film used in the prior-art sensor of FIGS. 1A and 1B, in which the starting point is placed on the point A located on the temperature falling curve.
Figure 3:
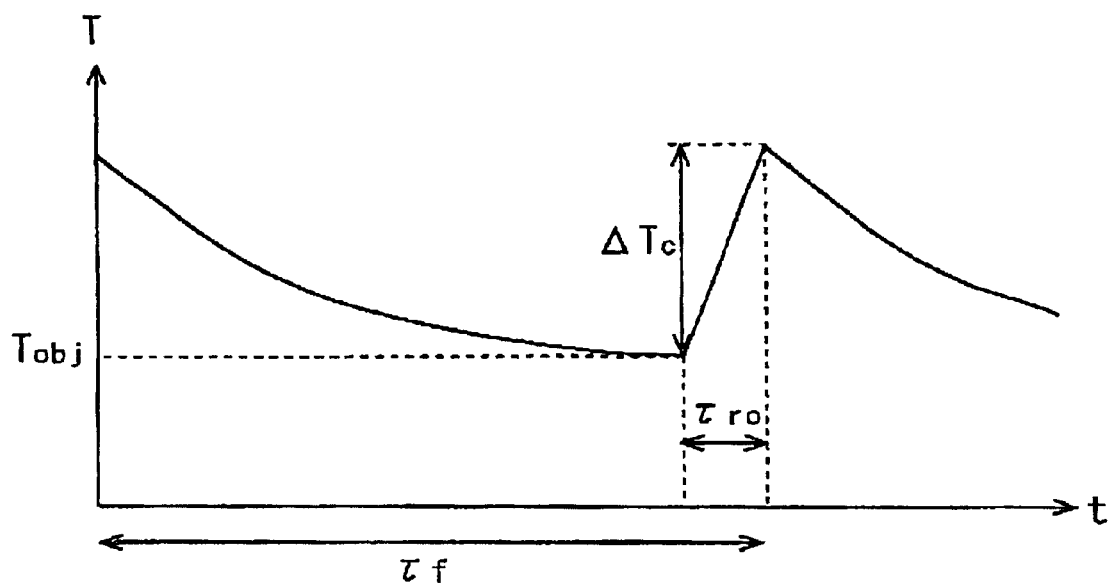
FIG. 3 is a graph showing the temperature cycle used in the prior-art sensor of FIGS. 1A and 1B.
Figure 4:
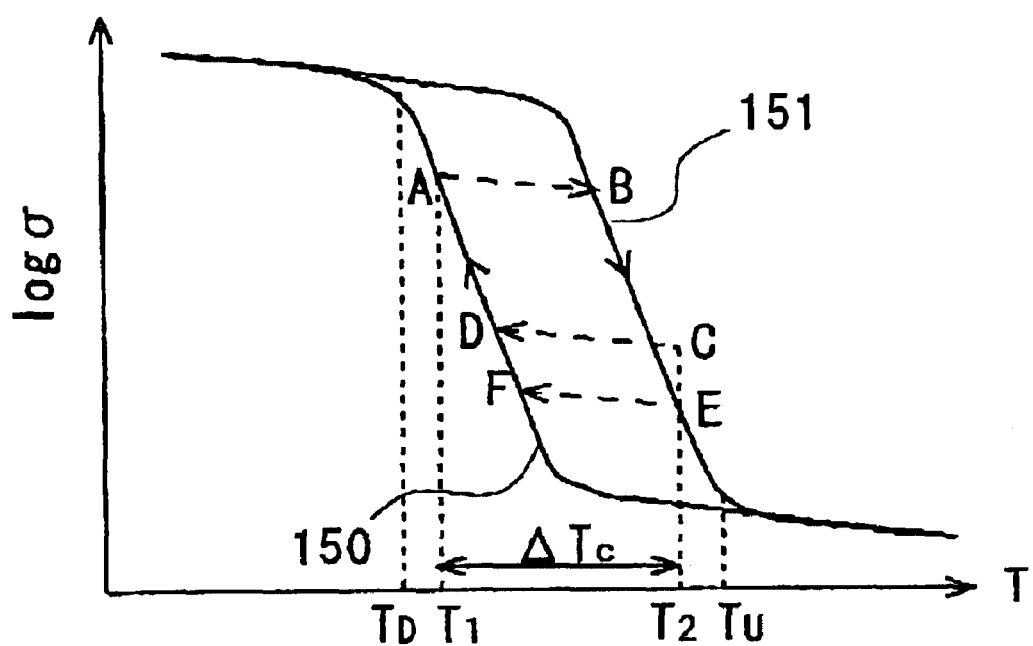
FIG. 4 is a graph showing the relationship between the specific resistance $\sigma$ and the temperature T of the bolometer film used in the prior-art sensor of FIGS. 1A and 1B, in which the starting point is placed on the point C that is shifted to the higher temperature side from the temperature rising curve.

Preferred embodiments of the present invention will be described in detail below while referring to the drawings attached.

Figure 5A:
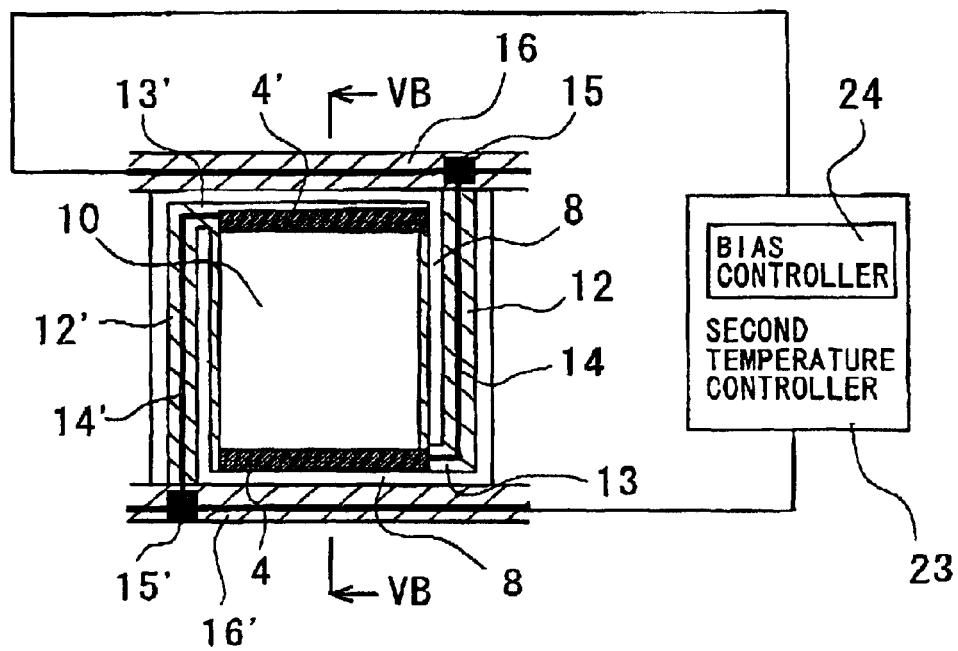
FIG. 5A is a partial plan view showing the structure of a bolometer-type infrared sensor according to an embodiment of the invention.
Figure 5B:
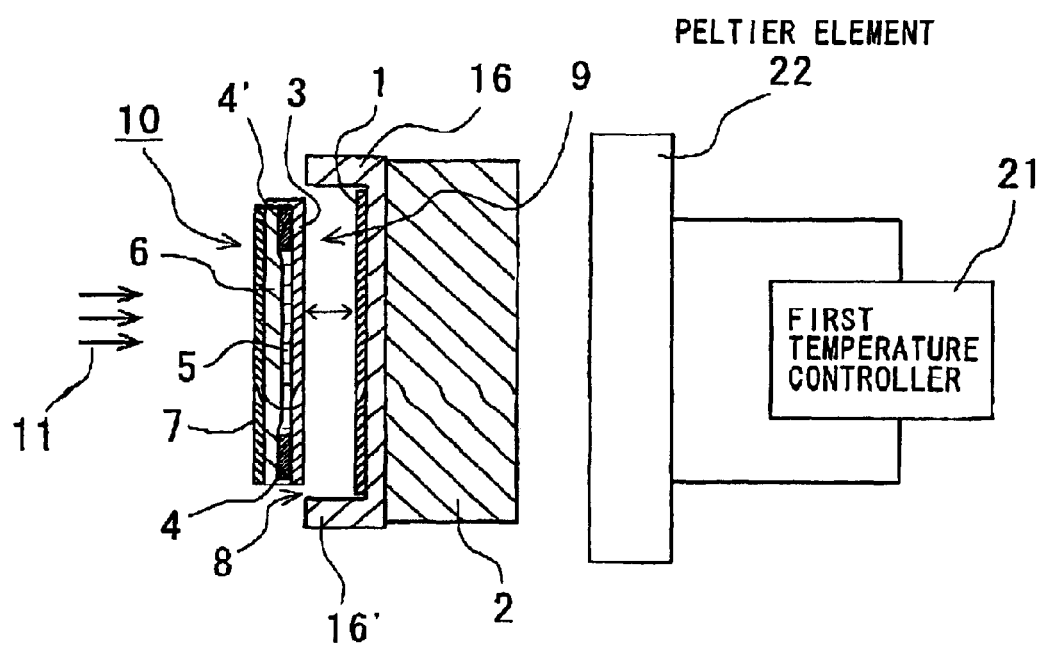
FIG. 5B is a partial, cross-sectional view along the line VB—VB in FIG. 5A.

FIGS. 5A and 5B show the structure of one pixel of an infrared sensor array according to an embodiment of the invention, which is termed an infrared sensor below.

As shown in FIG. 5B, the sensor has a diaphragm 10 for sensing infrared rays. The diaphragm 10 comprises a thin bolometer film 5, a dielectric supporting film 3, a dielectric protecting. film 6, and an infrared absorbing film 7. The supporting film 3, which is located on the inner side of the bolometer film 5, supports the film 5. The film 6, which is located to cover the bolometer film 5 on the outer side thereof, is used to protect the film 5. The infrared absorbing film 7 is used to absorb infrared rays irradiated toward the diaphragm 10.

The diaphragm 10 further comprises electrodes 4 and 4' at each end (the lower and upper ends in FIGS. 5A and 5B) of the bolometer film 5. The electrode 4 is connected to a wiring line 14. The electrode 4' is connected to a wiring line 14'. On operation, a pulsed bias voltage is applied across the electrodes 4 and 4' by way of the wiring lines 14 and 14'. Due to infrared rays 11 applied, the temperature of the bolometer film 5 changes and thus, the bolometer film 5 generates electrical resistance change. As a result, by reading out the electrical resistance change of the film 5, irradiation of the infrared rays 11 is detected through the change of voltage or current caused in the bolometer 5 by the pulsed bias voltage.

The diaphragm 10 is held on two banks 16 and 16' of a substrate 2 by way of two beams 12 and 12', thereby forming an isolated structure. This isolated structure is to constitute a thermal isolation structure of the diaphragm 10 (i.e the bolometer film 5) from the substrate 2.

A reflector film 1 is formed on the surface of the substrate 2 sandwiched by the banks 16 and 16'. A cavity or space 9 is formed between the diaphragm 10 and the reflector film 1. The distance between the film 1 and the diaphragm 10 is well adjusted in such a way that almost all the infrared rays 11 are absorbed by the infrared absorbing film 7. Due to absorption of the rays 11, the temperature of the diaphragm 10 raises and thus, the electrical resistance of the bolometer film 5 changes.

The banks 16 and 16' constitute the sidewalls of the cavity 9. The diaphragm 10 is thermally isolated from the banks 16 and 161 by a slit 8.

The reference numerals 13 and 13' denote the roots of the beams 12 and 12', respectively. The reference numerals 15 and 15' denote the contacts with the wiring lines 14 and 14', respectively. The sensor further comprises a first temperature controller 21, a Peltier element 22, and a second temperature controller 23. The second temperature controller 23 comprises a bias controller 24.

The first temperature controller 21 is used to control (i.e., raise or drop) the temperature of the diaphragm 10 from its outside with the Peltier element 22. Specifically, if a proper electrical current is supplied to the element 22, the element 22 generates or absorbs heat according to the orientation of the current supplied. Thus, the temperature of the diaphragm 10 is raised or dropped by the element 22 from the outside of the sensor.

The second temperature controller 23 is used to raise the temperature of the diaphragm 10 from its inside by supplying a bias voltage or current to the bolometer film 5 with the bias controller 24 by way of the wiring lines 14 and 14' and the electrodes 4 and 4'.

The first temperature controller 21 defines a lower-side temperature of a temperature cycle while the first and second temperature controllers 21 and 23 define an upper-side temperature thereof. The temperature of the diaphragm 10 is controlled according to this temperature cycle. A signal of the diaphragm 10 is read out at the upper-side temperature.

A dielectric protecting film, which is made of $SiO_2$, $Si_3N_4$, or SiON, may be formed on the infrared reflector film 1. This is to prevent the reflection characteristics of the film 1 from degrading due to fabrication processes after the film 1 is formed. The infrared absorbing film 7, which is formed as the top layer of the diaphragm 10, may be omitted, if the dielectric supporting film 3 and the dielectric protecting film 6 are made of $Si_3N_4$, SiON, and/or SiC. This is because these materials absorb the infrared rays with a wavelength of 8 to 13 $\mu$m and thus, the film 7 is not always necessary.

Next, the operation (i.e., a driving method) of the infrared sensor according to the embodiment of FIGS. 5A and 5B is explained below. Here, it is supposed that the bolometer film 5 has the temperature characteristic of resistance shown in FIG. 6, where the characteristic includes a hysteresis. Bolometer films having such the characteristic as shown in FIG. 6 may be formed by are known method, an example of which is disclosed by the Japanese Patent No. 2976924 issued in September 1999.

Figure 6:
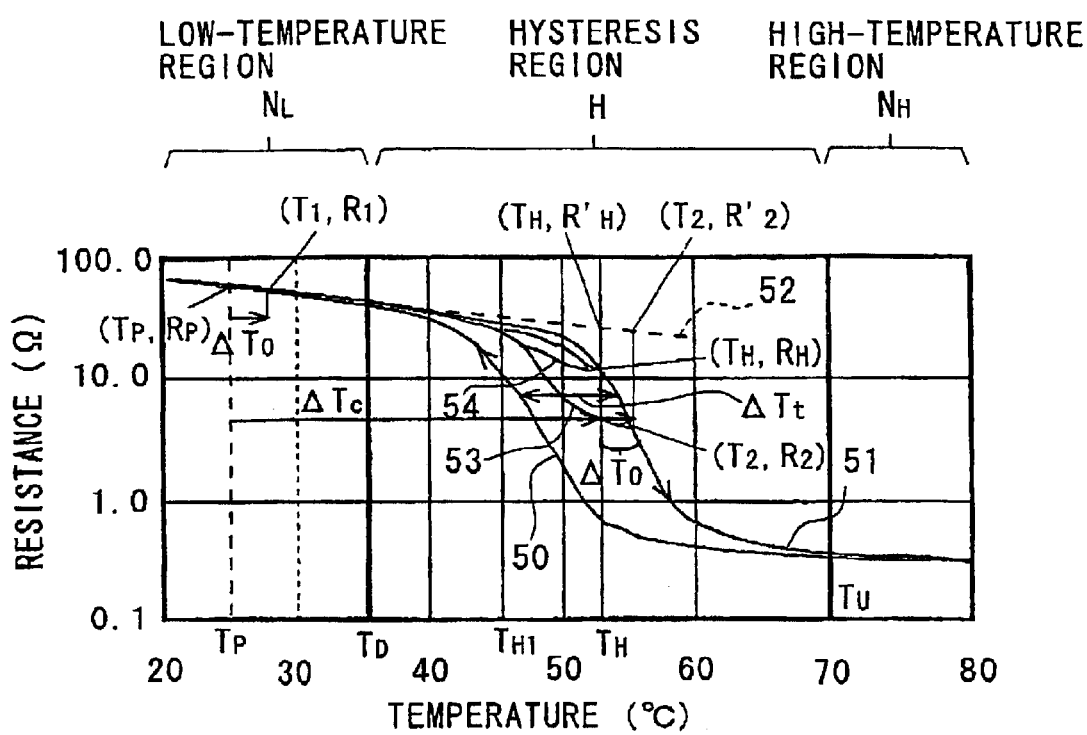
FIG. 6 is a graph showing the temperature characteristic of the resistance of the bolometer film used in the sensor according to the embodiment of FIGS. 5a and 5B, which shows the method of driving the same sensor.

FIG. 6 shows the temperature characteristic of resistance of the polycrystalline bolometer film 5. The characteristic is divided into three regions $N_L$, H, and $N_H$. The low-temperature region $N_L$ is a region where the temperature is equal to or less than $T_D$ and substantially no hysteresis is seen. The hysteresis region H where the temperature coefficient of resistance is large, hysteresis is seen, and the temperature is greater than $T_D$ and less than $T_U$ (i.e., $T_D$<T <$T_u$). The high-temperature region $N_H$ is a region where the temperature is equal to or greater than $T_u$ and substantially no hysteresis is seen.

In general, a crystal having a hysteresis in the temperature characteristic of resistance accompanies a primary phase transition (i.e., crystal structure change) and thus, a hysteresis occurs at the phase transition due to latent heat. As a result, a difference $\Delta T_t$ occurs between the temperature rising curve 51 along which the resistance decreases from the low-temperature region $N_L$ and the temperature falling curve 50 along which the resistance increases from the high-temperature region $N_w$. The difference $\Delta T_z$ varies according to the methods of crystal growth and film formation, even if the crystal is made of the same material.

Moreover, in general, the properties of a material change dramatically in a region where hysteresis is seen. If the temperature of the bolometer film 5, which includes hysteresis, is raised from a temperature $T_p$ in the low-temperature region $N_L$ to a temperature $T_H$ in the hysteresis region $N_H$, and then, it is returned to the starting temperature $T_p$, the resistance is returned to its initial value along the curve 53. However, if it is returned to a temperature $T_{H1}$ in the hysteresis region H, the resistance is not always returned to a value on the temperature rising curve 51 but to a value on a hysteresis loop 54 within a region sandwiched by the temperature rising curve 51 and the temperature falling curve 50. Accordingly, to stably operate the bolometer-type infrared sensor having a large temperature coefficient of resistance and a hysteresis, the following requirements (i) to (iii) is necessary.

(i) The initial operating point is placed in the low-temperature region $N_L$.

(ii) A read-out point (i.e., the next operating point) is placed in the hysteresis region H where the temperature coefficient of resistance is large and the sensitivity is high.

(iii) The read-out point (i.e., the next operating point) is returned to the initial operating point in the region $N_L$ after the read-out operation of signal is completed.

Figure 7A:
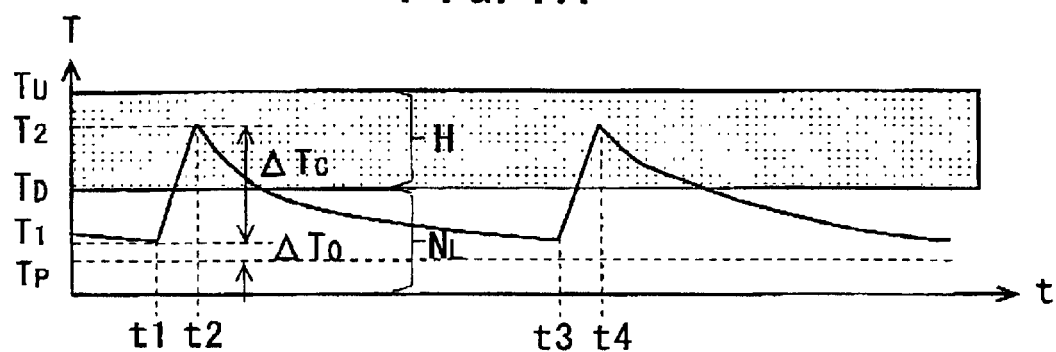
FIG. 7A is a graph showing the temperature cycle used to drive the sensor according to the embodiment of FIGS. 5a and 5B.

Taking the above-described requirements (i) to (iii) into consideration, the method of driving the infrared sensor according to the embodiment of the invention is explained below with reference to FIGS. 6, 7A, and 7B.

First, to place alternately or periodically the operating point of the sensor in the low-temperature region $N_L$ and the hysteresis region H, the sensor itself is placed on the Peltier element 22 to thereby set the temperature of the sensor at $T_p$ in the region $N_L$ with the first temperature controller 21. At the same time, a pulsed bias voltage $V_B$ is applied across the electrodes 4 and 4' with the bias controller 24 of the second temperature controller 23, thereby heating the diaphragm 10 and causing a temperature change, as shown in FIG. 7A. The pulsed bias voltage $V_B$ has a waveform, as shown in FIG. 7B. The pulse width of the voltage $V_B$ is $T_{ro}$, which is equal to the read-out time. In FIG. 7B, $T_f$ denotes the frame time.

Due to application of the pulsed bias voltage $V_B$, the temperature of the diaphragm 10 is raised to reach the temperature $T_2$ in the hysteresis region H. After the application of the pulsed bias voltage $V_B$ is completed, the temperature drops to the temperature $T_1$ in the low-temperature region $N_L$ according to the thermal time constant $T_{th}$ of the thermal isolation structure. The difference $\Delta T_o$ between the value of $T_L$ and the value of $T_p$ is minute, which will be seen from the test result described later.

The driving method is explained in detail below with reference to FIG. 6.

First, the bolometer-type infrared sensor of the embodiment of the invention, which has the thermal isolation structure, is placed on the Peltier element 22. Then, the sensor is heated by the element 22 and the first temperature controller 21 in such a way that the substrate 2 is set at the temperature $T_p$ in the low-temperature region $N_L$, that the operating point of the bolometer is set at a point $(T_p, R_p)$, and that the operating point of the diaphragm 10 is set at a point $(T_1, R_1)$ in the low-temperature region $N_L$. If no infrared rays are irradiated, the point $(T_p, R_p)$ is the same as $(T_1, R_1)$.

Figure 7B:
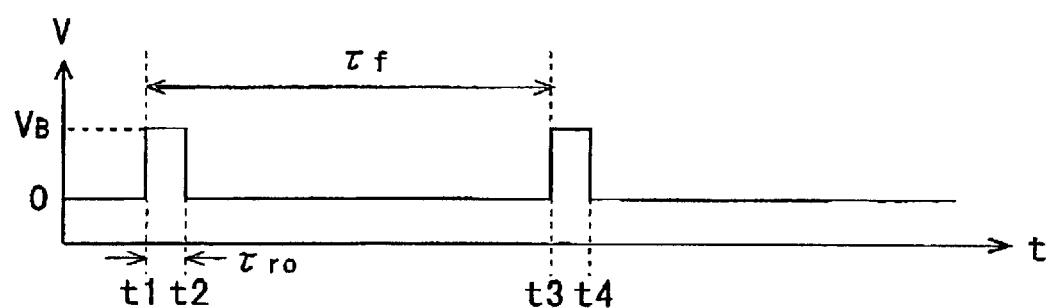
FIG. 7B is a waveform diagram showing the pulsed bias voltage used to drive the sensor according to the embodiment of FIGS. 5a and 5B, which causes the temperature cycle of FIG. 7A.

Next, the pulsed bias voltage $V_B$ shown in FIG. 7B is applied across the electrodes 4 and 4' to thereby heat the diaphragm 10. Thus, only the temperature of the diaphragm 10 is raised by $\Delta T_c$. As a result, the points $(T_p, R_p)$ and $(T_1, R_1)$ are shifted to points $(T_H, R_H)$ and $(T_2, R_2)$ in the hysteresis region H, respectively. When the quantity of sensitivity improvement is studied, it is thought that the operating point $(T_p, R_p)$ corresponds to the pixel to which no infrared rays are irradiated, and that the operating point $(T_1, R_1)$ corresponds to the pixel to which some infrared rays are irradiated.

As seen from FIG. 6, with the above-described driving method of the invention, when the signal of the sensor is read out in the hysteresis region H, the variation rate of resistance with respect to the temperature change is increased. The increasing rate G of the variation rate of resistance can be estimated by extrapolating the temperature characteristic of resistance in the low-temperature region $N_L$ into that of the hysteresis region H. See the broken line 52 in FIG. 6.

The increasing rate G is given by the following equation (3).

$$G = \frac{R_2 - R_H}{R'_2 - R'_H} \frac{R'_2 + R'_H}{R_2 + R_H} \quad (3)$$

The invention has the following advantages compared with the prior-art bolometer-type infrared sensor created by kawano and disclosed in the Publication No. 2000-55737.

Specifically, with the Kawano's sensor, the value of the bias voltage $V_B$ and/or the pulse width $T_{ro}$ need to be adjusted in such a way that the temperature of the diaphragm 10 is placed within the hysteresis region H (i.e., temperature range from $T_D$ to $T_t$). In this case, if the bias voltage $V_B$ has its upper and lower limits, the driving condition includes small margin, and the hysteresis characteristic includes dispersion, there is a possibility that the sensor does neat operate well. Moreover, the fact that the bias voltage $V_B$ has an upper limit will cause a problem relating to the responsivity, which is seen from the equation (2).

Unlike this, with the invention, by adjusting the setting temperature $T_p$ of the Peltier element 22 well, the driving condition such as the value of the bias voltage $V_B$ and/or the pulse width $T_{ro}$ can be expanded. In particular, the upper limit of the bias voltage $V_B$ can be raised further. As a result, the problems of the prior-art sensor can be solved.

To confirm the advantages of the invention, the inventor carried out the following test.

A bolometer-type infrared sensor array (the array format of the pixels was 320×240 and the pixel pitch was 37 $\mu$m) was fabricated. Vanadium oxide was used for the bolometer film 5 with hysteresis.

The sensor array was attached to a Peltier element and encapsulated by a vacuum package. The pixel of the sensor array had a thermal conductance $G_{th}$ of approximately 0.1 $\mu$W/K, the heat capacity $C_{th}$ of approximately 1.0 nJ/K, and the thermal time constant $T_{th}$ of approximately 10 msec. The read-out time $T_{ro}$ of the pulsed bias voltage $V_B$ was, for example, 60 $\mu$sec, which dominated the bandwidth of circuits and the quantity of noise.

The substrate 2 of the 320×240 sensor array was set at the temperature $T_p$ of 25° C. in the low-temperature region $N_L$ by the Peltier element 22. The resistance $R_B$ of the bolometer at the temperature $T_p$ of 25° C. was 61 k$\Omega$. When the bias voltage $V_B$ of 5.2 V was applied across the diaphragm 10, the temperature rise $\Delta T_c$ of the diaphragm 10 due to Joule heat was approximately 27° C. according to the equation (1), and the temperature of the diaphragm 10 was 52° C. This means that the operating point was shifted to the point $(T_H,$ $R_H$) in the hysteresis region H, ($T_H=52°$ C., $R_H=12.3$ kΩ). These values were obtained when no infrared rays were irradiated.

Next, when a blackbody at 50° C. (=323K) was placed near the sensor array as an object at the background temperature of 27° C. (=300 K.), the temperature of the diaphragm 10 was raised by $\Delta T_o$ of approximately 140 mK. In this caser the operating point was shifted to the point ($T_2$, $R_2$), where $T_2=52.14°$ C. and $R_2=12.197$ kΩ. To clarify the state of this, $\Delta T_o$ is enlarged in FIG. 6.

If the embodiment of the invention is compared with a bolometer material without any hysteresis (i.e., the temperature characteristic curve 52 in FIG. 6), $T_2=52.14°$ C. and $R_2=25.827$ kΩ ($R'_H=25.9$ kΩ). Thus, the increasing rate G is approximately three from the equation (3), which means that the sensitivity of the invention is approximately three times as much as that of the prior-art sensor. This is seen from the fact that the temperature resolution of the 320×240 sensor array was improved by approximately three times.

VARIATIONS

Needless to say, the present invention is not limited to the above-described embodiments because the embodiment is a preferred one of the invention. Any change or modification may be added to them within the spirit of the invention.

While the preferred forms of the present invention have been described it is to be understood that modifications will be apparent to those skilled in the art without departing from the spirit of the invention. The scope of the present invention, therefore, is to be determined solely by the following claims.

What is claimed is:

1. A bolometer-type infrared sensor comprising:
   (a) a substrate;
   (b) a diaphragm supported by the substrate with a beam in a suspended manner;
   the diaphragm having a bolometer film with a hysteresis in its thermal characteristic of resistance;
   (c) a first temperature controller for raising or dropping temperature of the diaphragm from its outside; and
   (d) a second temperature controller for raising temperature of the diaphragm from its inside by supplying electricity to the bolometer film;
   wherein the first temperature controller defines a lower-side temperature of a temperature cycle while the first and second temperature controllers define an upper-side temperature thereof;
   and wherein the temperature of the diaphragm is controlled according to the temperature cycle;
   and wherein a signal on the diaphragm is read out at the upper-side temperature.

2. The sensor according to claim 1, wherein the thermal characteristic of resistance of the bolometer film is divided into a low-temperature region where no hysteresis is seenr, a hysteresis region where hysteresis is seen, and a high-temperature region where no hysteresis is seen;
   and wherein the first and second temperature controllers are operated in such a way that the lower-side temperature is placed in the low-temperature region and the upper-side temperature is placed in the hysteresis region.

3. The sensor according to claim 1, wherein the temperature of the diaphragm is controlled according to the temperature cycle while taking a temperature rise due to irradiated infrared rays into consideration.

4. The sensor according to claim 1, further comprising a Peltier element and a bias controller;
   wherein the Peltier element is controlled by the first temperature controller and the bias controller is controlled by the second temperature controller.

5. A method of driving a bolometer-type infrared sensor, the sensor comprising a substrate, and a diaphragm supported by the substrate with a beam in a suspended manner;
   the diaphragm having a bolometer film with a hysteresis in its thermal characteristic of resistance;
   the method comprising:
   (i) raising or dropping temperature of the diaphragm from its outside by a first temperature controller; and
   (ii) raising temperature of the diaphragm from its inside by supplying electricity to the bolometer film by a second temperature controller;
   wherein the first temperature controller defines a lower-side temperature of a temperature cycle while the first and second temperature controllers define an upper-side temperature thereof;
   and wherein the temperature of the diaphragm is controlled according to the temperature cycle;
   and wherein a signal of the diaphragm is read out at the upper-side temperature.

6. The method according to claim 5, wherein the thermal characteristic of resistance of the bolometer film is divided into a low-temperature region where no hysteresis is seen, a hysteresis region where hysteresis is seen, and a high-temperature region where no hysteresis is seen;
   and wherein the first and second temperature controllers are operated in such a way that the lower-side temperature is placed in the low-temperature region and the upper-side temperature is placed in the hysteresis region.

7. The method according to claim 5, wherein the temperature of the diaphragm is controlled according to the temperature cycle while taking a temperature rise due to irradiated infrared rays into consideration.

8. The method according to claim 5, wherein a Peltier element and a bias controller are provided;
   and wherein the Peltier element is controlled by the first temperature controller and the bias controller is controlled by the second temperature controller.

9. The method according to claim 5, wherein the second temperature controller is operated by changing at least one of a pulsed bias voltage, a pulsed bias current, and a pulse width of the pulsed bias voltage or the pulsed bias current.

* * * * *